Dec. 9, 1958    N. AESCHMANN    2,864,018
IMPULSE MOTOR
Filed June 15, 1956    2 Sheets-Sheet 1
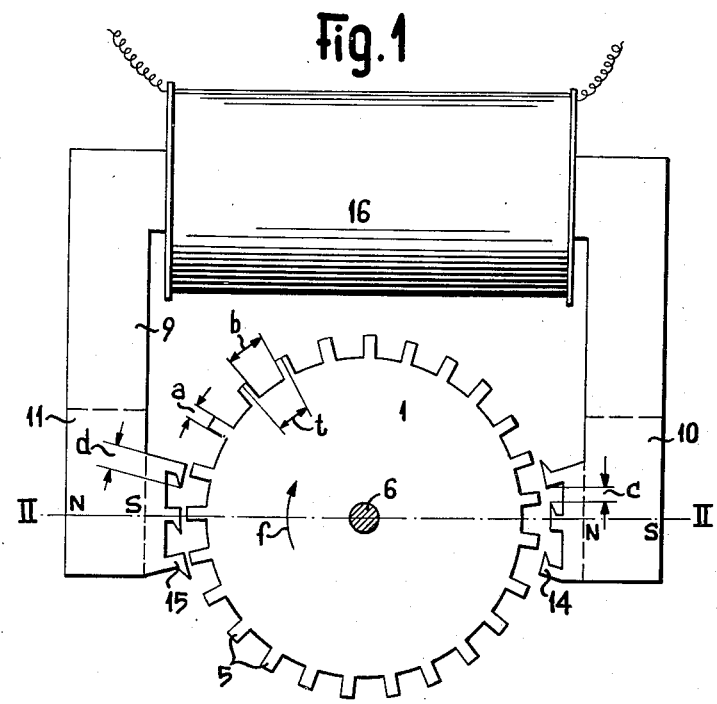
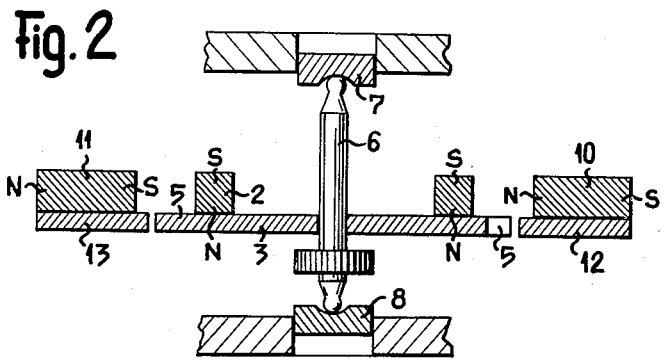
INVENTOR
NICOLAS AESCHMANN
By Young, Emery & Thompson
ATTYS.

Dec. 9, 1958 N. AESCHMANN 2,864,018
IMPULSE MOTOR
Filed June 15, 1956 2 Sheets-Sheet 2

INVENTOR
NICOLAS AESCHMANN
By Young, Emrys Thompson
ATTYS.

United States Patent Office 2,864,018
Patented Dec. 9, 1958

2,864,018
IMPULSE MOTOR

Nicolas Aeschmann, Bienne, Switzerland, assignor to Complications S. A., Neuchatel, Switzerland, a limited liability stock company of Switzerland Application June 15, 1956, Serial No. 591,739
Claims priority, application Switzerland July 19, 1955
5 Claims. (Cl. 310—163)

There are some types of electric motors which are intended to be worked by successive electric impulses of the same polarity. These motors generally comprise a ratchet-wheel which co-operates with a retaining pawl intended to fix the successive angular positions of the rotor. It is obvious that this type of motor does not have a satisfactory electric efficiency and that in addition the locking device which fixes the angular positions of the rotor is always a delicate mechanism, its components being liable to a relative quick wear.

This invention has as an object an impulse motor comprising a rotor revolving between the poleshoes of a stator and which tends to overcome the drawbacks quoted before by the fact that the motor comprises a ring-shaped permanent magnet, magnetized in the direction of its axis and provided with at least one armature made out of ferro-magnetic material, fastened on one of its front faces and provided with equally distributed teeth along its circumference and by the fact that the stator is provided with poleshoes which are connected by means of ferro-magnetic parts formed each by a permanent magnet, magnetized perpendicularly to the revolving axis of the rotor and carrying at least one armature made out of ferro-magnetic material fixed on one of its faces and provided with teeth situated along a circle concentric to the axis of the rotor, the pitch of which is equal to the pitch of the rotor's teeth and by the fact that this stator carries an excitation coil.

The attached drawing shows schematically and by way of example, two embodiments of a rotor according to the invention.

Figure 3:
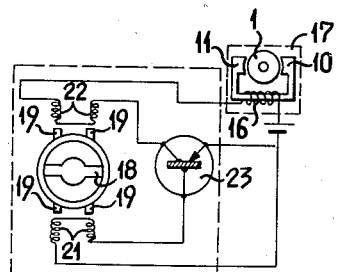
Figure 4:
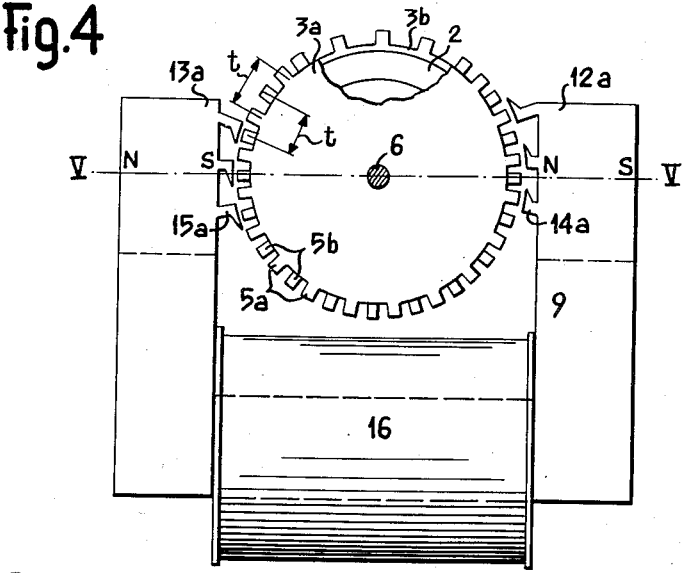
Figure 5:
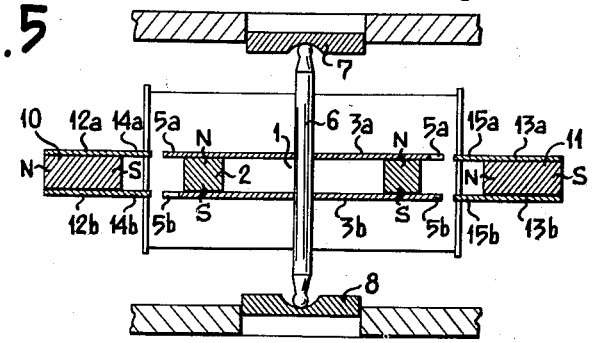

Fig. 1 is a top view of the first embodiment.
Fig. 2 is a cross section along line II—II of Fig. 1.
Fig. 3 is a connection diagram of a current impulse emitter device supplying the impulse motor.
Fig. 4 is a top view of a second embodiment of the motor.
Fig. 5 is a cross section along line V—V of Fig. 4.

According to Figs. 1 and 2 the impulse motor comprises a rotor 1 formed by a ring-shaped permanent magnet 2 magnetized in the direction of its axis. One of the front faces of this magnet carries an armature 3 of a circular shape and which diameter is greater than the external diameter of ring 2. This armature, provided with teeth 5 regularly distributed along its circumference, is rigidly fastened on an axis 6 made out of ferro-magnetic material, carried by bearings 7 and 8.

The stator looks like a horseshoe and comprises a ferro-magnetic core 9 providing a magnetic connection between two permanent magnets 10, 11 located on the one and the other side of the axis 6 and approximatively symmetrically with respect to a diametrical plan of the rotor. The two magnets 10 and 11 are magnetized in the same direction along an axis which is perpendicular to the revolving axis 6 of the rotor, and carry each a poleshoe 12, 13 provided with teeth 14, 15 situated on a circle concentric to the axis 6, and having the same pitch as the rotor's teeth. The ferro-magnetic core 9 carries also an excitation coil 16.

Each of the armature's teeth of the stator presents a foot carrying a head, the general shape of which is that of a triangle, extending on one side of the foot only.

The width $a$ of the rotor's teeth is smaller than the distance $b$ which sets apart two adjoining teeth. On the one hand the space $c$ between two following stator's teeth is slightly greater than the width $a$ of a rotor's tooth, whereas the width $d$ of the head of one stator's tooth is silghtly less than the space $b$ between two following rotor's teeth.

As shown in the drawing, all rotor's teeth are of the same polarity being in contact with the N pole of the ring-shaped permanent magnet. On the other hand the stator's teeth situated on one side of the axis 6 are of the same polarity as the rotor's teeth, whereas on the other side of the axis 6 the teeth are of the opposite polarity as those of the rotor.

Consequently the rotor's and stator's teeth which are of opposite polarity attract themselves whilst those of the same polarity push themselves away, so that the rotor stops in an angular balance position in which the teeth of the rotor are facing those of the stator, in the part of opposite polarity, whilst the rotor's teeth are located between those of the stator, in the part of same polarity (see Fig. 1).

As a current flows through the excitation coil 16, the field generated by this current inverses the polarity of the stator's poleshoes so that in the rest condition of the rotor (Fig. 1), the teeth which pushed themselves away attract, and vice-versa the teeth which attracted themselves push each other away. The rotor is therefore submitted to a torque and moves forward of an angle equivalent to the half of a tooth and equal to the half pitch $t$ of the toothing.

At the time of the rupture of the current flowing through the coil 16 the rotor moves forward a half of a pitch again in order to take a position corresponding to its initial rest position. Owing to the fact that the teeth of the stator have a special shape, the rotary motion always takes place in the same direction, that shown by the arrow $f$.

Supplying the excitation coil with successive current impulses of the same sign, there is obtained a jerky rotary motion step by step of the rotor. These impulses may be produced by an electric impulse generator 17 of known type, or which, in the case of a design used for keeping a clock-work in movement, may be formed by the impulse generator described in a connected application for Letters Patent and which is provided with a balance-wheel 18 (Fig. 3) carrying poleshoes 19 polarized by a permanent magnet 20 and co-operating with two coil groups 21 and 22 which circuits are coupled one to the other through a transistor 23. The impulse motor 17 described before being inserted in one circuit 22 of the coil's group whereas the other 21 coil's group is connected to the base of the transistor and controls the blocking and the unblocking of the transistor.

In the execution's modification shown in Figs. 4 and 5, the parts and components already described with reference to the Figs. 1 and 2 keep the same reference numerals.

The ring-shaped magnet 2 of the rotor 1 carries two armatures 3$a$ and 3$b$ fastened on its two front faces and are both equipped with teeth 5$a$ and 5$b$, having the same pitch $t$. The two armatures 3$a$ and 3$b$ are however displaced one with respect to the other of half of a pitch.

The permanent magnets 10 and 11 of the stator carry each two poleshoes 12$a$, 12$b$, 13$a$, 13$b$ provided with teeth 14$a$, 14$b$ and 15$a$, 15$b$. These poleshoes are fastened on the front faces of the permanent magnets.

The operation of this second embodiment is the same as that of the form of execution described with reference to Figs. 1 and 2.

The ring-shaped magnet 2 being magnetized in the direction of its axis, all teeth 5a of the armature 3a are of the same polarity, for example N, and all teeth 5b of the armature 3b are of the inverse polarity S. As shown in the drawing, the permanent magnets 10 and 11 are magnetized in the same direction but perpendicularly to the axis 6, so that the teeth of the poleshoes 13a and 13b are polarized S, whereas the teeth of the poleshoes 12a and 12b are polarized N. Consequently, the teeth 15a, 14b attract the teeth of the rotor, while the teeth 13b, 12a push them away. The rest position if no current flows in the coil 16 is that given in Fig. 1.

As the coil 16 is fed with an electric current, it generates a magnetic field in the stator which super-imposes itself to the field of the permanent magnets. This field is so choosen that it inverses the polarity of the armatures 13a, 13b, 12a, 12b. From then on, the teeth 13a and 12b push away the teeth facing them, whereas the teeth 14a and 15b attract the teeth which face the small end of the tooth's foot. The rotor revolves of an angle equal to the half pitch $t$ of the teeth 5a and 5b. When the current which flows in the coil 16 is interrupted the armatures 12a, 12b, 13a, 13b take their initial polarity again and the rotor moves forward in the same direction of half of a tooth until the next balance position corresponding to the position shown in Fig. 1.

Therefore, supplying the coil 16 with successive electric impulses, the rotor revolves in a jerky way moving of half of a pitch when the coil 16 is put under voltage of the excitation coil and then of a complementary half pitch when this feeding is cut off.

Two embodiments of the motor according to the invention have been described here as examples but it is obvious that many modifications can be taken in consideration and adapted to the requirements of each particular case.

I claim:

1. In an impulse motor comprising a stator and a rotor, in which said stator comprises two permanent magnets, a horseshoe like core magnetically connecting said permanent magnets, an excitation coil carried by said core, said stator having armatures made of ferromagnetic material and carried by said permanent magnets, said armatures constituting poleshoes disposed on both sides of said rotor, substantially symmetrically with respect to a diametrical plan of said rotor, teeth in said stator armatures, said teeth being located along arcs of a circle concentric to said rotor and facing said rotor, and in which said rotor comprises a ring-shaped permanent magnet magnetized in the direction of the revolving axis of said rotor, at least one rotor armature being fastened to a front face of said ring-shaped permanent magnet, and rotor teeth made in said rotor armature and located at the circumference of said rotor's armature, whereby the pitch of said rotor's teeth is equal to the pitch of said stator's teeth.

2. An impulse motor according to claim 1 and in which said two poleshoes are magnetized in the same direction, so that the N pole of one poleshoe is facing said rotor, whereas the S pole of the other poleshoe is facing said rotor.

3. In an impulse motor comprising a stator and a rotor, in which said stator comprises two permanent magnets, a horseshoe like core magnetically connecting said permanent magnets, an excitation coil carried by said core, the stator having armatures made of ferromagnetic material and carried by said permanent magnets, said armatures constituting poleshoes disposed on both sides of said rotor, substantially symmetrically with respect to a diametrical plan of said rotor, teeth made in said stator armatures, said teeth being located along arcs of a circle concentric to said rotor and facing said rotor, and in which said rotor comprises a ring-shaped permanent magnet magnetized in the direction of the revolving axis of said rotor, at least one rotor armature fastened to a front face of said ring-shaped permanent magnet, rotor teeth made in said rotor armature and located at the circumference of said rotor armature, whereby the pitch of said rotor's teeth is equal to the pitch of said stator's teeth, and in which said stator teeth comprises each a foot and a head carried by said foot, said head having the general shape of a triangle extending only on one side of said foot, and said rotor teeth having the general shape of a rectangle.

4. An impulse motor according to claim 3 in which said rotor comprises only one of said rotor armatures fastened on one of the front faces of said ring-shaped magnet, and in which said stator carries also only one of said stator armatures fastened on one of the lateral faces of each of said permanent magnets, both stator and rotor teeth facing each other.

5. An impulse motor according to claim 3 in which said rotor carries two rotor armatures fastened each on one of the front faces of said ring-shaped permanent magnet, and said stator carries two of said stator armatures fastened each on each side of said two permanent magnets, and in which said two rotor armatures are angularly displaced one with respect to the other of an amount equal to half of a pitch of said rotor teeth, both of said stator and rotor armatures facing each other.

No references cited.